United States Patent [19]

Kaneko et al.

[11] Patent Number: 5,358,305
[45] Date of Patent: Oct. 25, 1994

[54] SUSPENSION SYSTEM FOR AUTOMOTIVE VEHICLE OR THE LIKE

[75] Inventors: Takanobu Kaneko; Toshimichi Hanai, both of Yokosuka; Sadahiro Takahashi, Ageo; Takeshi Fujishiro, Yokohama, all of Japan

[73] Assignee: Nissan Motor Co., Ltd., Japan

[21] Appl. No.: 718,929

[22] Filed: Jun. 25, 1991

Related U.S. Application Data

[63] Continuation of Ser. No. 449,128, Dec. 8, 1989, abandoned, which is a continuation of Ser. No. 231,266, Aug. 12, 1988, abandoned.

[30] Foreign Application Priority Data

Aug. 13, 1987 [JP] Japan .................. 62-201000
Aug. 13, 1987 [JP] Japan .................. 62-201001

[51] Int. Cl.⁵ .................................. B60N 2/52
[52] U.S. Cl. .................... 296/65.1; 180/89.14; 188/299; 248/566; 248/592; 267/131; 267/177; 280/707
[58] Field of Search .......... 296/63, 65.1, 68.1, 296/; 180/89.13, 89.14, 282; 280/707, 714; 188/299, 319; 267/131, 175, 177; 248/559, 566, 574, 592; 364/424.05

[56] References Cited

U.S. PATENT DOCUMENTS

| | | | |
|---|---|---|---|
| 2,964,272 | 12/1960 | Olson | 248/550 |
| 3,807,678 | 4/1974 | Karnopp et al. | 248/562 |
| 4,363,377 | 12/1982 | Van Gerpen | 180/282 |
| 4,468,050 | 8/1984 | Woods et al. | 280/707 |
| 4,469,010 | 9/1984 | Skover, Jr. et al. | 267/131 X |
| 4,528,894 | 7/1985 | Crosby | 92/12 |
| 4,579,366 | 4/1986 | Doi et al. | 280/707 |
| 4,595,072 | 6/1986 | Barnea | 280/6.1 X |
| 4,648,622 | 3/1987 | Wada et al. | 280/707 |
| 4,657,280 | 4/1987 | Ohmori | 280/707 |
| 4,662,597 | 5/1987 | Vecker et al. | 267/131 X |
| 4,696,489 | 9/1987 | Fujishiro et al. | 280/707 |
| 4,809,179 | 2/1989 | Klingler et al. | 280/707 X |
| 4,822,094 | 4/1989 | Oldfather et al. | 296/65.1 |
| 4,826,205 | 5/1989 | Kouda et al. | 280/707 X |
| 4,827,416 | 5/1989 | Kawagoe et al. | 280/707 X |
| 4,834,419 | 5/1989 | Kozaki et al. | 280/707 |
| 4,838,574 | 6/1989 | Baraszu | 280/707 |
| 4,907,680 | 3/1990 | Wolfe et al. | 188/299 |
| 4,913,482 | 4/1990 | Hanai et al. | 296/65.1 |

FOREIGN PATENT DOCUMENTS

| | | |
|---|---|---|
| 4970067 | 7/1974 | Japan . |
| 5140579 | 10/1976 | Japan . |
| 60-104828 | 6/1985 | Japan . |
| 215127 | 10/1985 | Japan . |
| 60-248419 | 12/1985 | Japan . |
| 61-74930 | 4/1986 | Japan . |
| 62-74728 | 4/1987 | Japan . |
| 1230734 | 5/1971 | United Kingdom ......... 296/63 |

OTHER PUBLICATIONS

"The Active Damper-A New Concept for Shock and Vibration Control" by Crosby and Karnopp, Bulletin 43 (Part 4 of 4 Parts) published by The Shock and Vibration Information Center, Naval Research Laboratory, Washington, D.C., Jun. 1973.

Thompson, A. G., "Design of Active Suspensions", *Proceedings Institute of Mechanical Engineers*, Jun. 18, 1971, vol. 185, No. 36, pp. 553–563.

Symposium Paper No. 92, published Sep. 10, 1986 (presented at a Society of Automotive Engineers of Japan, Inc. symposium held in Oct. 1986).

*Primary Examiner*—David M. Mitchell
*Assistant Examiner*—Andrew C. Pike
*Attorney, Agent, or Firm*—Lowe, Price, LeBlanc & Becker

[57] ABSTRACT

A seat suspension is provided that has a damper unit which is connected between the seat and the chassis on which the seat is mounted. The damper can be switched between soft and hard settings. The damper switching is controlled based on the relative position of the seat and one of the relative or absolute velocity of the seat. When the seat and the chassis are moving in the same direction the damper is set to soft, (producing a low damping effect), while when the seat and chassis are moving in opposite directions the damper is switched to hard (producing a high damping effect).

11 Claims, 13 Drawing Sheets

SUSPENSION SYSTEM FOR AUTOMOTIVE VEHICLE OR THE LIKE

CROSS-REFERENCE TO RELATED APPLICATION

This application is a continuation of application Ser. No. 07/449,128, filed Dec. 8, 1989, now abandoned which is a continuation of application Ser. No. 07/231,266, filed Aug. 12, 1988, now abandoned.

BACKGROUND OF THE INVENTION

1. Field of the Invention

The present invention relates generally to suspension of a vehicle seat, and more specifically to a suspension arrangement for a vehicle seat the hardness characteristics of which can be automatically adjusted in response to movement characteristics thereof relatively to the vehicle chassis on which it is mounted.

2. Description of the Prior Art

FIGS. 17 and 18 show a previously proposed suspension arrangement used to support a seat in a vehicle cabin or the like. This arrangement is disclosed in detail in British Patent Specification No. 1,230,734. As shown, a pair of springs 2,2 and a pair of dampers 4, 4 are disposed in a seat frame which is arranged essentially horizontally with respect to a frame or base.

One end of each of the springs 2, 2 and dampers 4, 4 is secured to a transverse connecting member 6 which extends between two pairs or scissor arms 8. The other ends of the dampers 4, 4 are connected to the seat frame 10 while the other ends of the springs 2, 2 are connected with a lever arrangement 12 which permits the tension in the springs to be adjusted. This arrangement, while permitting a very compact arrangement which can be readily applied to reclining seats has suffered from the drawback that as the springs 2, 2 and the dampers 4, 4 are operatively interconnected in a manner which permits the same to act directly against one and other, the damping period of the system tends to be excessively long, thus permitting the seat to oscillate up and down in a manner which imparts a disturbingly unstable sensation to the occupant. The arrangement also cannot be adjusted in a manner which selectively varies the hardness of seat suspension characteristics.

In order to overcome this problem it has been proposed in Japanese Patent Application 60-215127 filed on Sep. 30, 1985, one of three priority documents upon which United States application Ser. No. 912,801, now U.S. Pat. No. 4,913,482, is based. This U.S. Application by Hanai (one of the coapplicants of this application), was filed on Sep. 29, 1986, and the same is hereby incorporated by reference. This reference teaches a vehicle suspension system which includes a road condition sensing arrangement and means, such as variable setting shock absorbers for varying the hardness and damping characteristics of the suspension; and suspension of the seat on an arrangement wherein a variable setting type shock absorber is connected between the seat and the floor or chassis on which the seat is mounted. The shock absorber is provided with a valve arrangement which is switched between soft and hard settings synchronously with the setting of the suspension.

With this arrangement when the vehicle encounters a rough road, both the vehicle suspension and the seat suspension are simultaneously conditioned to produce "hard" characteristics. A drawback encountered in this approach is that the hardness of both suspensions causes vibrational energy transmitted to the chassis via the road wheels and the vehicle suspension to also be transmitted directly to the seat via the hard conditioned shock absorber of the seat suspension.

On the other hand, when the vehicle is traversing a smooth road, the seat suspension shock absorber is conditioned to produce soft characteristics at the same time as the vehicle suspension is so conditioned. Under these conditions, the seat suspension fails to maintain the level of the seat relative to the vehicle floor and permits the occupant to "float up and down" in a manner which disconcertingly induces a change in the person's eye point level.

SUMMARY OF THE INVENTION

It is a principal object of the present invention to provide a seat suspension system which can automatically harden or soften the seat suspension characteristics in a controlled manner so as to damp out vibrations and simultaneously obviate the tendency for the seat occupant to float up and down in a disconcerting manner.

In brief, the above object is achieved by an arrangement wherein the seat suspension is controlled by sensing the relative position of the seat with respect to the chassis on which it is mounted, determining either the relative or absolute velocity of the seat, comparing the polarities of the two values, and producing a control signal which varies in accordance with the comparison.

More specifically, a first aspect of the present invention comprises a vehicle which features: a chassis; a seat; a seat suspension for suspending the seat on the chassis, the seat suspension including a spring and a vibration damping device, the vibration damping device including a device for varying the damping characteristics of the same, the suspension further including structural members which operatively interconnect the seat and the chassis, the vibration damping device being connected between the seat and the chassis; a sensor, the sensor being arranged to sense the position of the seat relative to the chassis; and a control circuit, the control circuit being arranged to be responsive to the output of the sensor and to control the damping characteristics of the vibration damping device in accordance with a predetermined control schedule.

A second aspect of the present invention in the above-mentioned control circuit includes means for: producing a first value indicative of the relative position of the seat with respect to the chassis; producing a second value indicative of the velocity of the seat; monitoring the first and second values; and conditioning the device to produce first suspension characteristics in accordance with the polarities of the first and second values.

A third aspect of the invention comprises a vehicle which features: a chassis; a road wheel; a vehicle suspension operatively interconnecting the road wheel and the chassis; a seat; a seat suspension for suspending the seat on the chassis, the seat suspension including a spring and a vibration damping device, the vibration damping device including a device for varying the damping characteristics of the same, the suspension further including structural members which operatively interconnect the seat and the chassis, the vibration damping device being connected between the seat and the chassis; a sensor, the sensor being arranged to sense the position of the seat relative to the chassis; and a control circuit, the control circuit being arranged to be responsive to the output of the sensor and to control the damping characteristics of the vibration damping device in accordance with a predetermined control schedule.

A fourth aspect of the present invention comprises a method of suspending a vehicle seat on a vehicle chassis which method features the steps of: interconnecting the seat and the chassis with a damping device capable of producing first and second damping characteristics; sensing the position of the seat relative to the chassis; determining the relative velocity of the seat with respect to the chassis; comparing the relative position and relative velocity; and controlling the damping device in response to the comparison.

A fifth aspect of the present invention relating to the above-mentioned method further comprises the steps of: assigning a positive sign to the relative position when the relative position is above a predetermined neutral value, and a negative sign when the relative position is below the neutral value; assigning a positive sign to the relative velocity when the seat is moving in a first direction away from a neutral position and a negative sign when the seat is moving in a second direction away from the neutral position; controlling the damping device to produce a first damping characteristic when the signs of the relative position and relative velocity are the same; and controlling the damping device to produce a second damping characteristic when the signs of the relative position and relative velocity are different.

A further aspect of the present invention comprises a vehicle which features a chassis; a seat; a seat suspension for suspending the seat on the chassis, the seat suspension including a spring and a vibration damping device, the damping device including an arrangement for varying the damping characteristics of the same, the suspension further including structural members which operatively interconnect the seat and the chassis, the damping device being connected between the seat and the chassis; a first sensor, the first sensor being arranged to sense the position of the seat relative to the chassis; a second sensor, the second sensor being arranged to sense the acceleration of the seat; and a control circuit, the control circuit being arranged to be responsive to the output of the first and second sensors and to control the damping characteristics of the vibration damping device in accordance with a predetermined control schedule.

A seventh aspect of the invention involves the above-mentioned control circuit and further includes means for: producing a first value indicative of the relative position of the seat with respect to the chassis; producing a second value indicative of the velocity of the seat; monitoring the polarity of the first and second values; and conditioning the device to produce first suspension characteristics in accordance with the polarities of the first and second values.

Another aspect of the invention relates to a vehicle comprising: a chassis; a road wheel; a first suspension operatively interconnecting the road wheel and the chassis; a seat; a seat suspension for suspending the seat on the chassis, the seat suspension including a spring and a damping device, the damping device including a device for varying the damping characteristics of the same, the suspension further including structural members which operatively interconnect the seat and the chassis, the damping device being connected between the seat and the chassis; a first sensor, the first sensor being arranged to sense the position of the seat relative to the chassis; a second sensor, the second sensor being arranged to sense the acceleration of the seat; and a control circuit, the control circuit being arranged to be responsive to the outputs of the first and second sensors and to control the damping characteristic control device in accordance with a predetermined control schedule.

Yet another aspect of the present invention relates to a method of suspending a vehicle seat on a vehicle chassis Which method features the steps of: interconnecting the seat and the chassis with a damping device capable of producing first and second damping characteristics; sensing a position of a seat relative to a chassis; determining the velocity of the seat with respect to the chassis; monitoring the magnitudes of the relative position and velocity; and controlling the damping device in response to the magnitudes.

A further aspect of the invention involves the above-mentioned method and further comprises the steps of: assigning a positive sign to the relative position when the relative displacement between the seat and the chassis is increased from a predetermined neutral value or magnitude of distance, and a negative sign when the relative displacement decreases below said predetermined neutral value; assigning a positive sign to the velocity when the seat is moving in a first direction, e.g., upward, and a negative sign when the seat is moving in a second direction, e.g., downward; controlling the damping device to produce a first damping characteristic (soft) when the signs of the relative position and relative velocity are the same; and controlling the damping (hard) device to produce a second damping characteristic when the signs of the relative position and relative velocity are different.

DETAILED DESCRIPTION OF THE PREFERRED EMBODIMENTS

Figure 1:
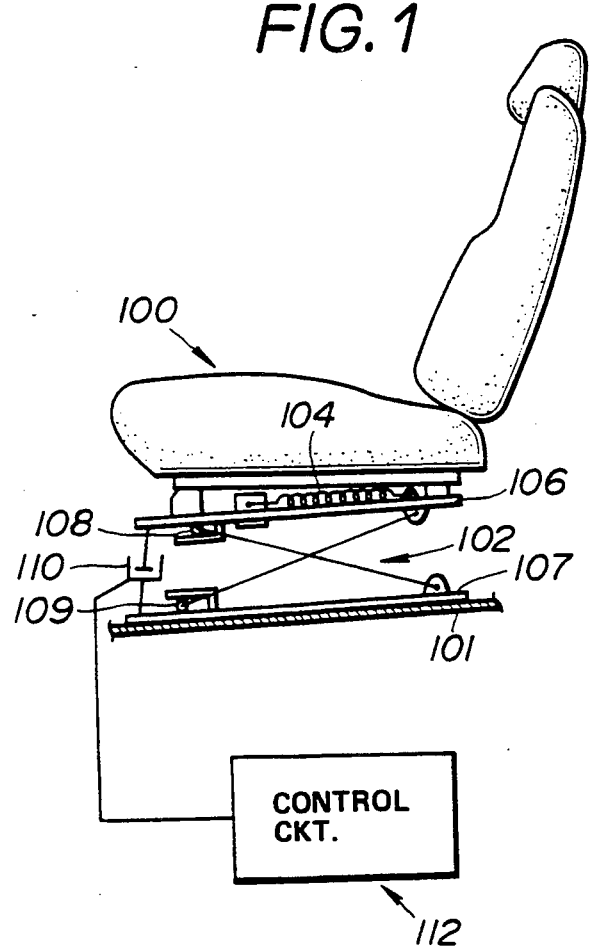
FIG. 1 is a schematic elevation of basic seat suspension arrangement which characterizes a first embodiment of the present invention.

FIG. 1 shows in schematic form the basic arrangement a first embodiment of the seat suspension according to the present invention.

In this first embodiment a seat 100 is resiliently supported on a vehicle floor or chassis by suspension unit which includes two pairs of scissor arms generally denoted by the numeral 102.

Springs 104 are operatively interconnected between an upper base plate 106, upon which the seat proper 100 is mounted, and to upper ends of the legs 102b of each of the scissor arm arrangements. The numeral 107 denotes the lower base plate of the suspension unit.

The tension in springs 104 controls the amount by which the upper ends of the scissor arm arrangements are drawn together and therefore the height of the seat 100 above the vehicle floor (chassis 101).

The forward ends of the arms 102 are provided with rollers 108, 109 or similar sliding arrangements to permit the smooth raising and lowering of the seat.

A single shock absorber or damper device 110 is connected directly between the upper base plate 106 and the floor or chassis 101 of the vehicle. According to the present invention this damper 110 is arranged to be adjustable so as to provide at least one hard and one soft setting to enable the resiliency and damping characteristics of the suspension arrangement to be selectively variable. The present invention further provides a control circuit arrangement 112 responsive to the output of a sensor 323 which detects the position of the seat (height) relative to the chassis 101.

Figure 2:
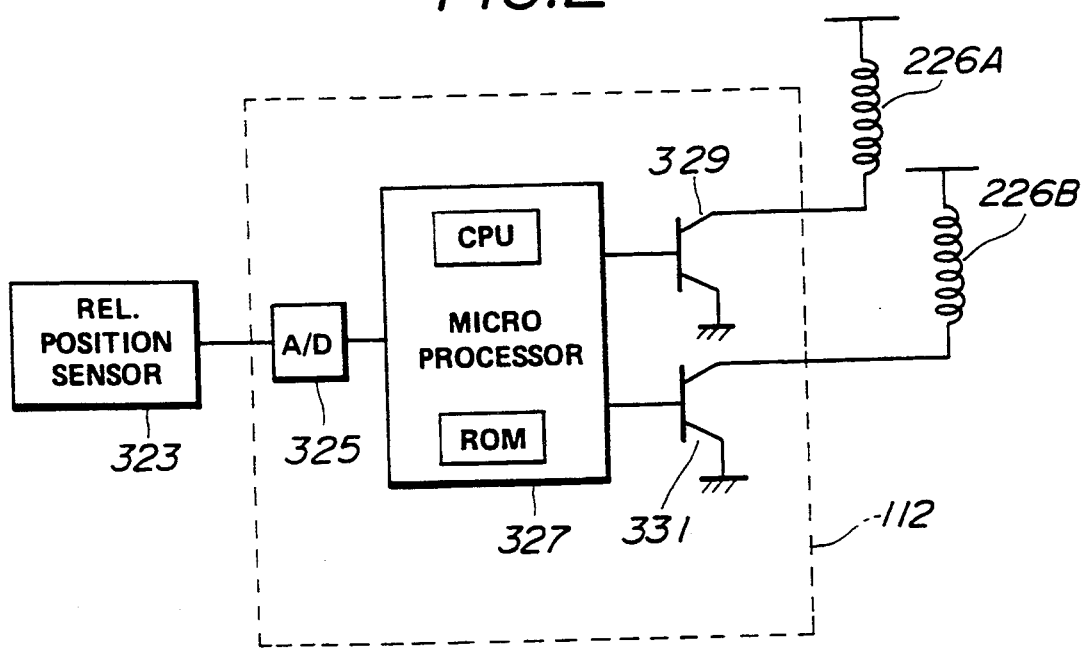
FIG. 2 is a block diagram showing the basic arrangement of the control system which forms a vital part of the instant invention.

FIG. 2 shows in block diagram form the circuitry involved in the control of the embodiment of the present invention.

In this figure the numeral 323 denotes a sensor which detects the relative position or height of the seat with respect to the chassis of the vehicle. The output of this sensor is fed to an A/D converter 325 which suitably converts the analog output of the sensor into a form suitable for application to the input interface of a microprocessor 327 which comprises a CPU. The microprocessor 327 is arranged to process the date inputted from the sensor 323 to determine when it is necessary to condition the shock absorber 110 to produce "soft" suspension characteristics and when it is necessary to produce "hard" suspension characteristics. In response to the decisions produced in the CPU of the microprocessor 327, signals are produced at the output interface which selectively render one of transistors 329 and 331 conductive. When a signal is applied to the base of the transistor 329, it becomes conductive and permits power to flow through the coil of a solenoid 226A which forms part of a motor arrangement that will be discussed in more detail below in connection with FIGS. 9 and 10. On the other hand, if a signal is applied to the base of transistor 331, power is permitted to flow through the coil of a solenoid arrangement 226B which will be also discussed in more detail below. In this arrangement, the energization of the solenoid arrangement 226A is such as to condition the shock absorber 110 to produce soft damping characteristics while energization of solenoid 226B produces hard ones.

Figure 16:
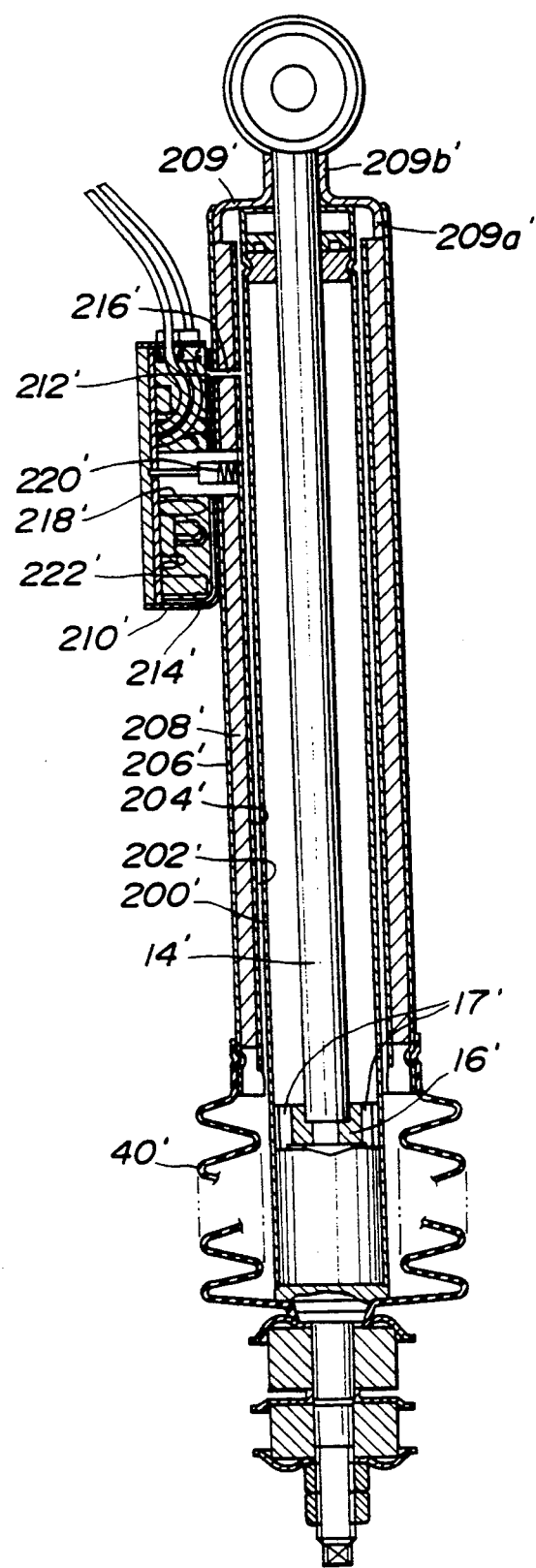
FIG. 16 is a sectional elevation view showing a position sensor arrangement of the nature which can be integrated with a shock absorber and which can be used in the shock absorbing arrangements of the embodiments of the present invention to sense the relative displacement between the seat and the vehicle chassis on which the seat is mounted.
Figure 17:
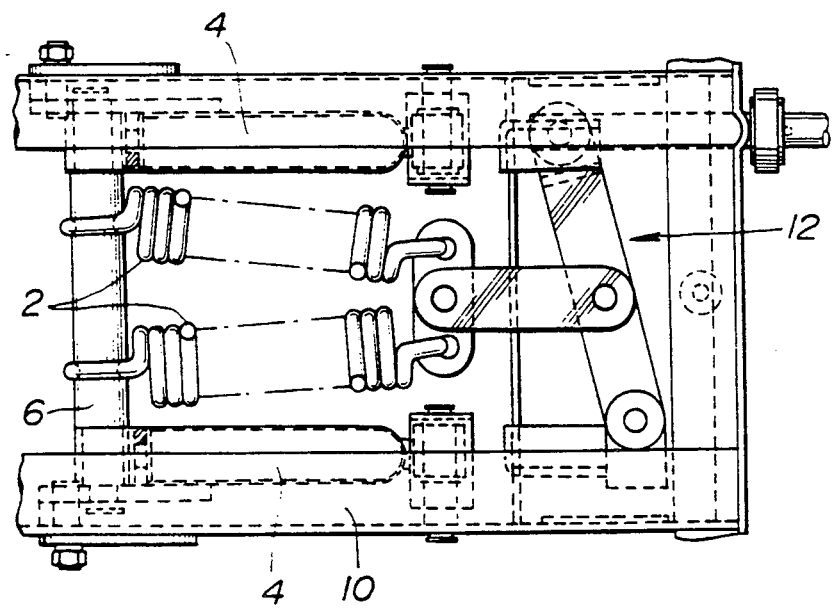
FIGS. 17 and 18 are respectively plan and elevation views of the first of the prior art arrangements discussed in the opening paragraphs of the instant disclosure.
Figure 18:
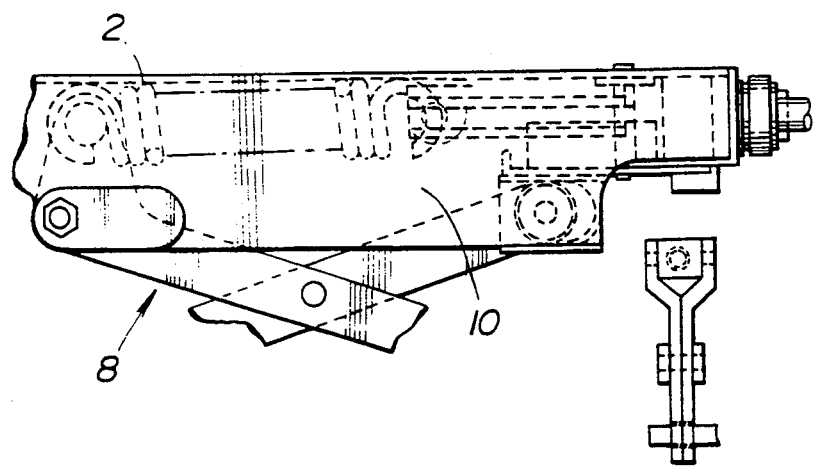

According to the present invention it is possible to connect the sensor 323 in any suitable arrangement between the seat and the chassis in a manner which enables the position and movement of the seat to be monitored. However, merely by way of example, in the instant embodiment the sensor is mounted on the shock absorber 110 in a manner which takes advantage of the change in length of the same. FIG. 16 shows an example of the type of device that may be used in this instance. For further disclosure relating to this kind of device reference may be had to U.S. Pat. No. 4,788,489 incorporated herein by reference.

The above-mentioned '489 patent relates to a construction wherein a circuit, which is responsive to the change in capacitance developed between the piston rod and a cylindrical member which is arranged coaxially with respect to the piston rod, is mounted on the shock absorber per se. The arrangement also features the use of electrically conductive dust boots which ensure a positive grounding and the offsetting of any noise produced by nearby electrical apparatus. The arrangement illustrated in FIG. 16 is such as to provide a reference capacitor in addition to a measuring one to compensate for drifts in output caused by temperature changes and the like.

Figure 3:
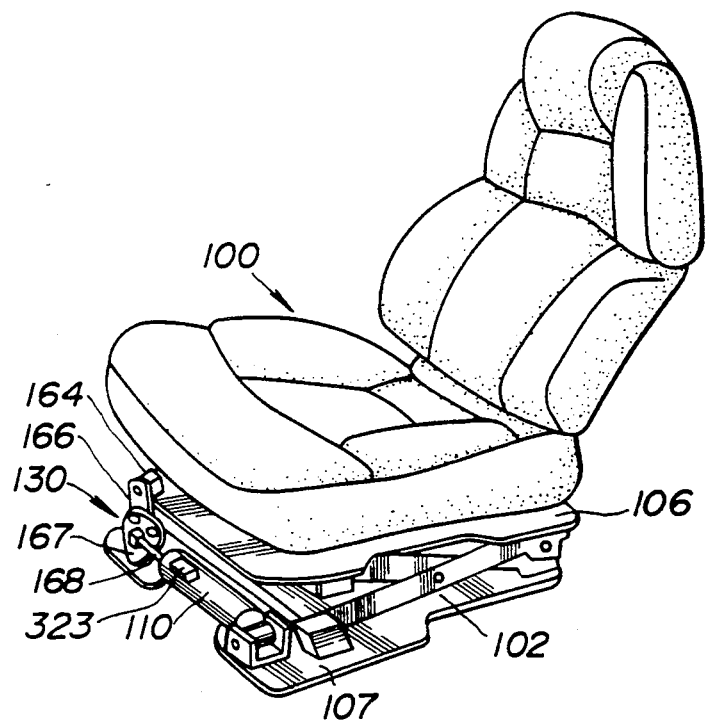
FIG. 3 is a perspective view of a first embodiment of the present invention.

In order to achieve a compact arrangement such as required in modern automotive vehicles, the single shock absorber strut or damper device 110 is arranged transversely with respect to the seat 100 as shown in FIG. 3 and operatively interconnected with the seat 100 via a crank mechanism 130 which translates the vertical movement of the seat 100 into telescopic or reciprocal movement of the shock absorber strut 110.

Figure 4:
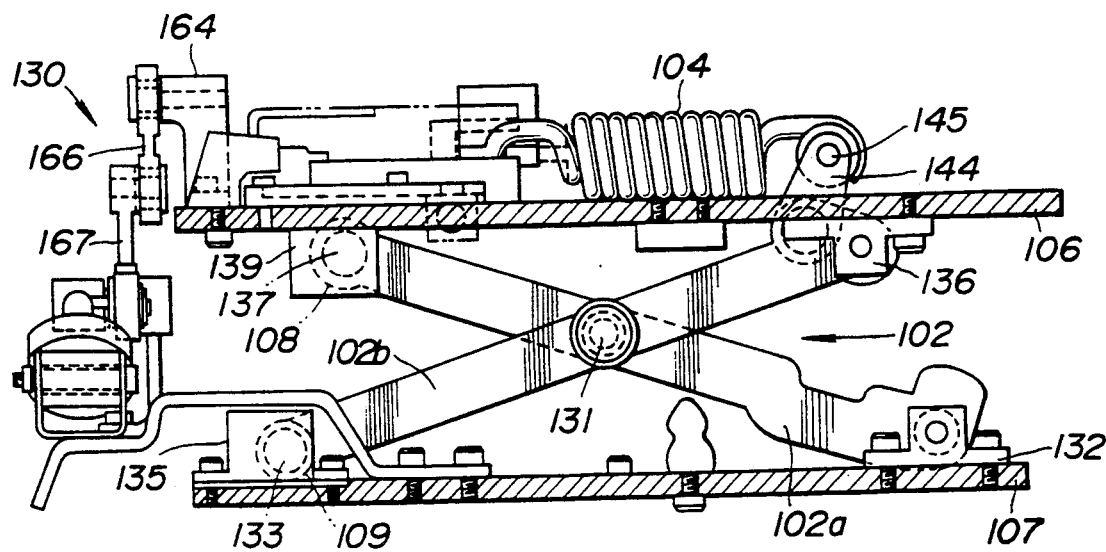
FIGS. 4 and 5 are side elevation and plan views, respectively, of the suspension mechanism of the first embodiment.
Figure 5:
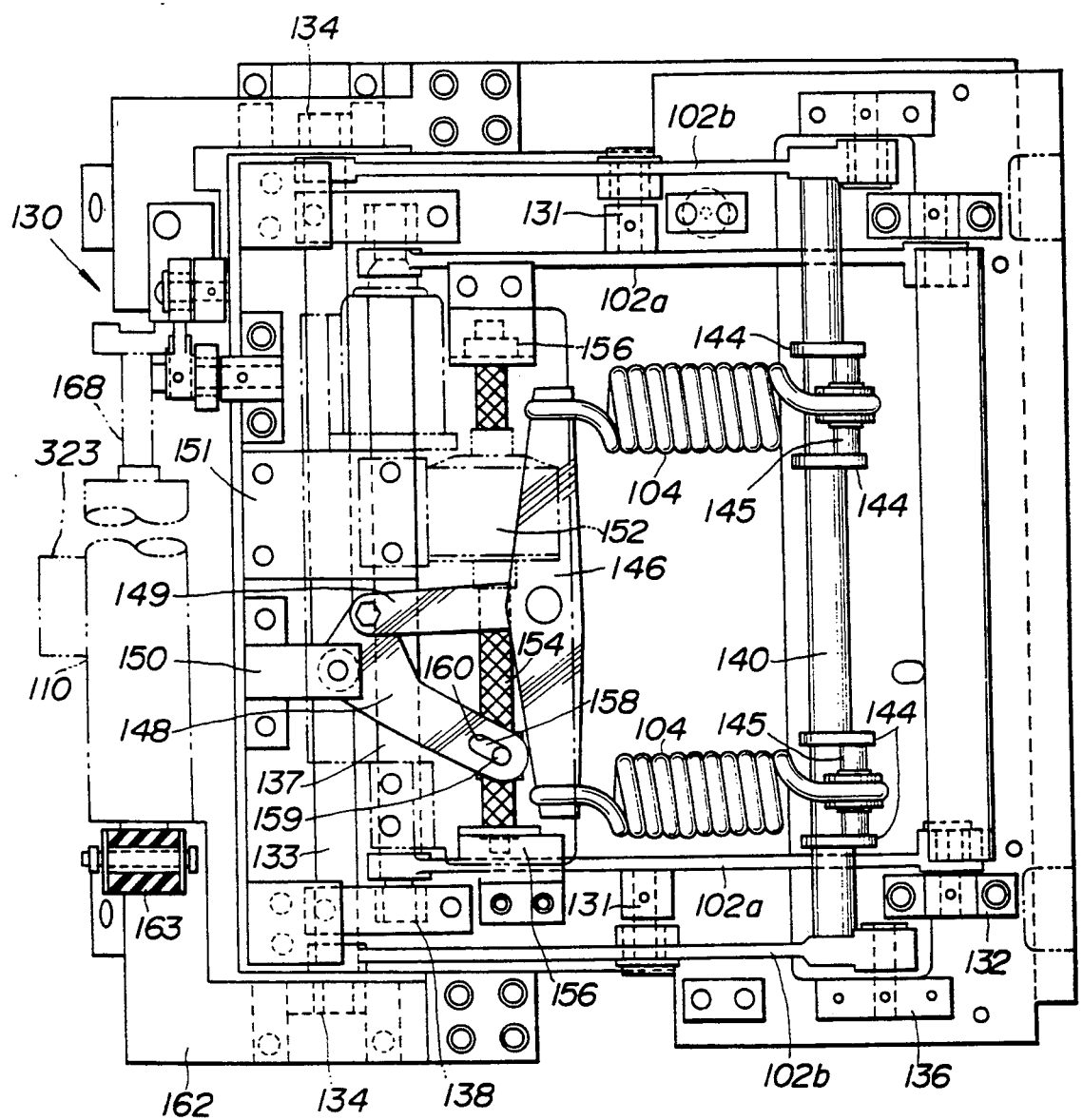

FIGS. 4 and 5 show in detail a suspension unit via which the vehicle seat is resiliently supported on the vehicle floor. This arrangement includes the previously mentioned upper base plate 106 to which the frame of the seat 100 may be detachably connected and the lower base plate 107 which can be detachably connected to the floor or chassis of the vehicle. The arms of each pair of scissor arms 102 which extend between the upper and lower base plates 106, 107 are pivotally interconnected by pins 131. As best seen in FIG. 5 these pins extend through bosses (no numeral) formed on the levers.

The lower rear ends of the arms 102a are pivotally connected to the lower base plate via suitable brackets 132. The lower forward ends of the arms 102b are interconnected by a rod 133 the ends of which are provided with rollers 109. Brackets 135 are connected to the lower base plate 107 in a manner to enclose the rollers 109 and to function as guides therefor.

The rear upper ends of the scissor arms 102b are pivotally connected to the upper base plate 106 by brackets 136 while the forward ends of arms 102a are pivotally connected to a transverse bar 137 the ends of the which are provided with rollers 108. Brackets 139 are fixed to the upper base plate. These brackets 139 extend down and around the rollers 108 and function as guides for the same.

A transverse rod 140 is fixedly connected to the upper ends of the arms 102b. The aft ends of relatively powerful springs 104 are connected to rod 140 through brackets 144 and pins 145. With this arrangement, as the pins 145 are eccentric with respect to axis about which the upper ends of the arms 102b are pivoted, the tension in the springs 104 acts through the brackets 144 in a manner to apply a rotational torque to levers 102b.

The forward end of the springs 104 are connected to a transverse lever 146 which in turn is connected to a bell-crank lever 148 via an intermediate lever 149.

The bell-crank lever 148 is pivotally mounted on a bracket 150 fixed to a forward end of the upper base plate 106. A reversible electric motor 152 is mounted on a bracket 151 which is arranged adjacent to and parallel with the bracket 150 on which the bell-crank lever 148 is mounted. A threaded drive shaft 154 is arranged to extend from either side of the motor 152 and to be received in suitable bearing members 156 fixed to the sides of the upper base member 106. The drive shaft 154 is arranged to be driven in first and second rotational directions via selective energization of the motor 152.

A nut 158 threadedly received on the shaft is operatively connected to the bell-crank lever 148 via a pin 159 which is received in an elongate slot 160 formed near the end of the lever.

With this arrangement, rotation of the shaft 154 in a first rotational direction increases the tension in the springs 104 while rotation in a second and opposite rotation direction relieves the same. Viz., rotation which moves the nut 158 toward the motor 152 moves the bell-crank lever 148 in a manner which increases the tension while rotation in the reverse direction reduces the same.

The damper or shock absorber strut unit 110 is pivotally connected at one end to an "L" shaped bracket 162 connected to a front corner of the lower base plate. The pivotal connection is made through a vibration damping elastomeric bush 163. The other end of the unit is operatively connected with the upper base plate 106 through a crank arrangement generally denoted by the numeral 130. This arrangement is such that as the upper base frame 106 descends toward the lower one 107, the crank arrangement 130 compresses the damper 110 and vice versa and comprises a bracket 164 fixed to the upper side of the upper base plate 106, and first and second links 166, 167 which operatively interconnect the bracket and the piston rod 168 of the shock absorber 110.

Figure 6:
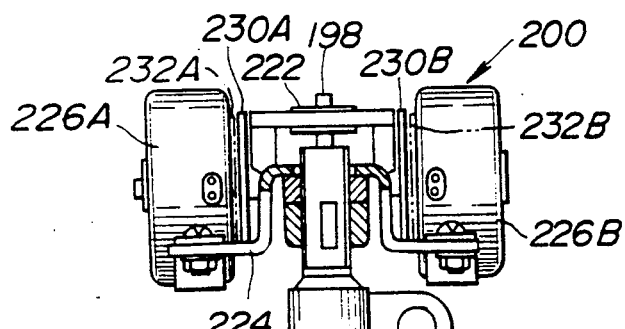
FIG. 6 is a partially sectioned elevation view of a hydraulic shock absorber or damper unit utilized in the embodiments of the present invention.
Figure 7:
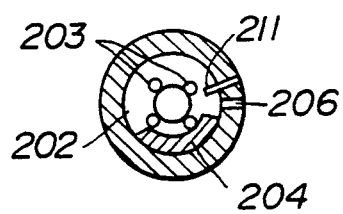
FIGS. 7 and 8 are sectional views taken along section lines VII—VII of FIG. 6 showing a slide valve which forms a vital part of the damper hardness control mechanism in its first and second operative positions respectively.
Figure 8:
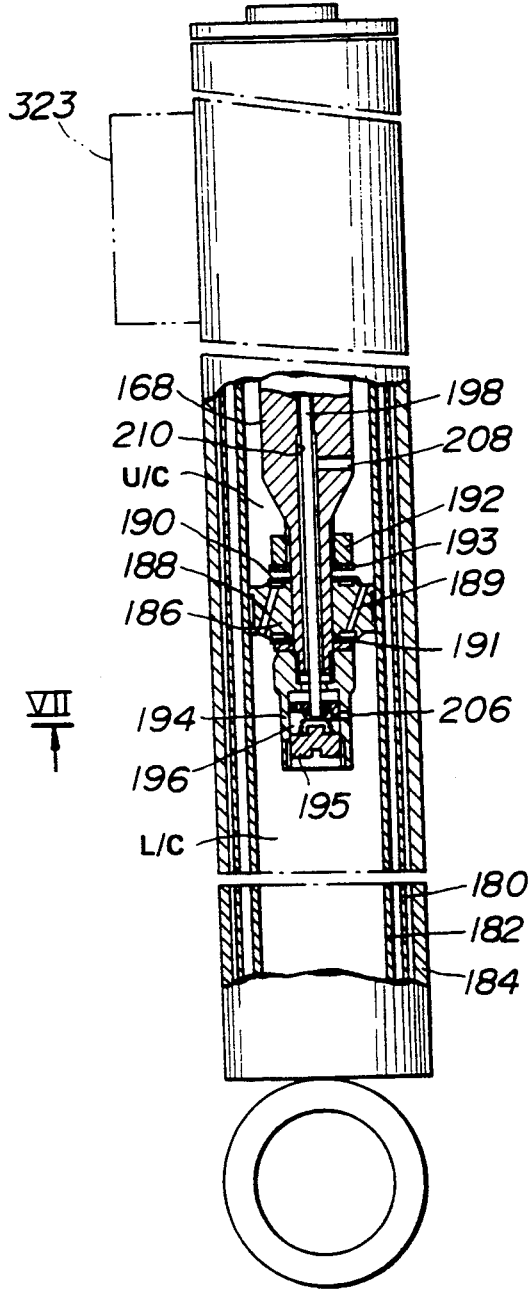
Figure 8:
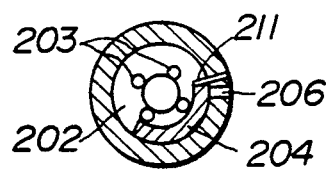

FIGS. 6 to 8 show constructional details of the shock absorber utilized in the embodiments of the present invention. As shown this unit includes a thin tube construction which includes an actuator tube 180 and an inner tube 182. This construction is disposed within a strut tube 184. A piston 186 is slidably received in the inner tube 182 in a manner to divide the interior of the inner tube into upper and lower chambers U/C, L/C. This piston 186 is disposed on the piston rod 168 adjacent the end thereof and formed with orifices 188, 189. These orifices are controlled by disc valves 190, 191. Threadedly received on the piston rod 168 above the piston 186 is a nut 192 and metal seat member 193. Threadedly received on the end of the piston rod below the piston is an orifice nut 194. This latter mentioned element is formed with a large diameter coaxial blind bore which is closed by a plug 195 threadedly disposed in the mouth thereof in manner to define a fixed volume valve chamber 196.

A control rod 198 is disposed through an elongate coaxial bore (no numeral) formed along the length of the piston rod 168. This control rod projects out of the upper end (as seen in the drawings) of the piston rod and is operatively connected to a rack and pinion drive arrangement 200 which is operable to rotate the control rod 198 in first and second rotational directions. The lower end of the rod 198 projects into the valve chamber 196 and has a valve element 202 fixed thereto. As best seen in FIGS. 7 and 8 this valve element is formed with a plurality of small diameter through bores 203 and a downwardly depending flange portion 204 which is arranged to selectively control the communication between the valve chamber 196 formed in the orifice nut 194 and the lower chamber L/C via radial bore 206 which functions as an orifice. Communication between the upper chamber U/C and the valve chamber 196 is established by the combination of a radial bore 208 and coaxial bore 210. The latter mentioned bore 210 forms an annular passage about the lower portion of the control rod 198. To limit the amount of rotation which the valve element 202 may undergo, a stopper pin 211 is arranged to project into the valve chamber 196 in a manner to be abuttable with the flange portion 204.

When the valve element 202 is rotated to the position shown in FIG. 7, the shock absorber is conditioned to permit the working fluid contained in the shock absorber to be more readily transferred between the upper and lower chamber than in the case said element is rotated to the position shown in FIG. 8. Viz., when the valve element 202 is set to the position shown in FIG. 7, additional communication is provided between the upper and lower chamber U/C, L/C via the passage structure including elements 208, 210, 196, and 206 whereby the shock absorber is conditioned to produce "soft" suspension characteristics. On the other hand, when valve element 202 is set in the position shown in FIG. 8, "hard" characteristics are produced.

Figure 9:
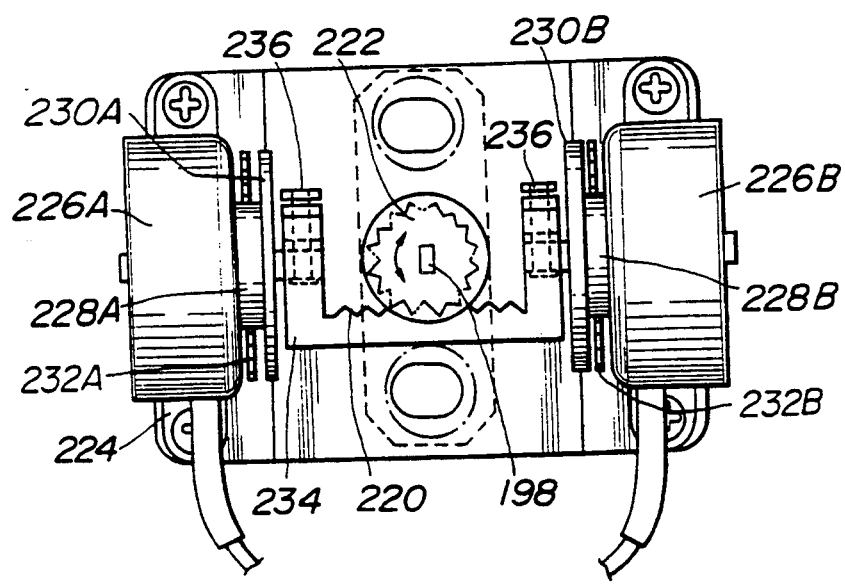
FIGS. 9 and 10 show the rack and pinion mechanism via which the valve arrangement shown in FIGS. 7 and 8 can be selectively moved between its first and second positions.
Figure 10:
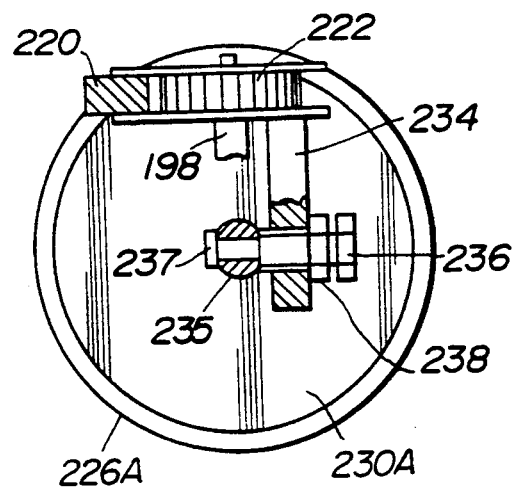

FIGS. 9 and 10 show the construction and arrangement of the rack and pinion/motor drive arrangement 200 via which the control rod 198 and valve element 202 are selectively rotatable. This arrangement basically comprises a solenoid powered linear actuator which is operative to selectively drive a rack 220 in first and second opposed directions and a pinion 222 which meshes with the rack 220 and is connected to the control rod 198 for synchronous rotation therewith. In more detail this arrangement comprises a bracket 224 which is fixed to the upper end of the piston rod 168.

This bracket 224 mounts two opposed solenoid arrangements 226A and 226B. Cores 228A, 228B, which are adapted to undergo axial movement only, are reciprocatively disposed in the solenoids 226A and 226B, respectively. Flange members 230A and 230B are formed integrally on the outboard ends (with respect to the solenoids) of the cores 228A, 228B.

Interposed between the flanges and the housings in which the solenoids are disposed are elastomeric shock absorbing washer-like members 232A, 232B. The bracket-like member 234 on which the rack 220 is formed is connected at its ends with axial projections 235 which extend from the faces of the flanges, 230A, 230B, via adjusting screws 236. These screws 236 are as shown in FIG. 10, rotatably disposed through bores formed in the projections 235. Small heads 237 formed via rivetting or the like on the ends of the screws prevent the same from being accidentally removed from the bores. Male threads formed on the screws 236 cooperate with corresponding female threads formed in bores formed in downwardly extending leg portions of the bracket-like member. Lock nuts 238 are provided to secure the arrangement when the rack 220 is adjusted into suitable chatter free engagement with the teeth of the pinion 222.

Figure 11:
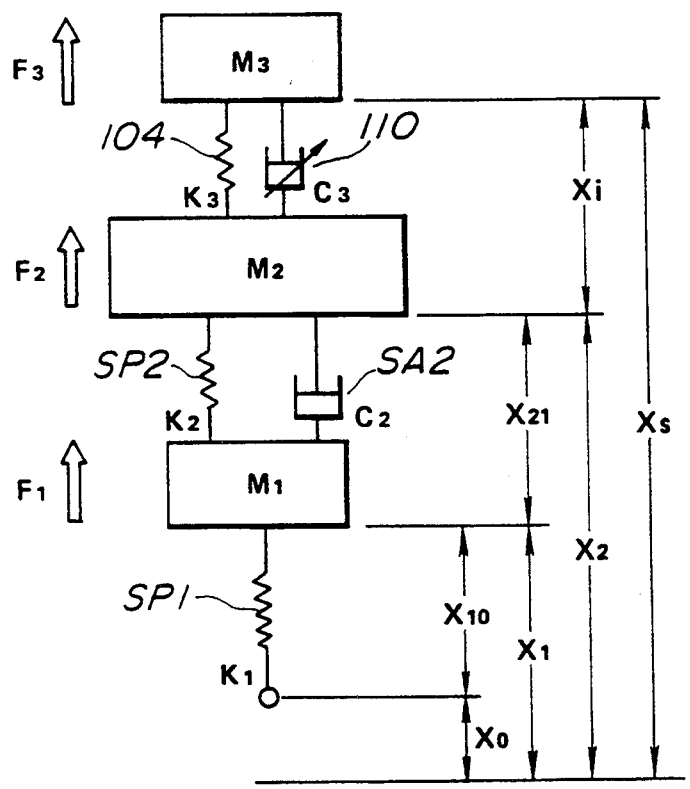
FIG. 11 is a schematic illustration, in terms of a mass/spring system, of a seat suspended on a vehicle chassis via the arrangement which characterizes the present invention and its interrelation with the suspension system of the vehicle.

FIG. 11 shows in terms of a mass/spring system the arrangement of the seat and vehicle suspensions.

In this figure:

M1 : unsuspended mass of the vehicle suspension;
M2 : the sprung mass of the vehicle suspension;
M3 : the combined mass of the seat and the seat occupant;
K1 : the spring constant of the spring defined by the vehicle tires;
K2 : the spring constant of the springs of the vehicle suspension;
K3 : the spring constant of the springs used in the seat suspension
Xs : the absolute displacement of the vehicle seat;
X2 : the absolute displacement of the vehicle chassis;
X1 : the lower absolute displacement of the vehicle suspension springs;
Xo : the road surface displacement;
Xi : the relative displacement of the seat with respect to the chassis;
X21 : relative displacement defined between the upper and lower vehicle spring positions;
X10 : displacement between the road surface and the lower vehicle suspension spring position;
C3 : damping coefficient of the seat suspension shock absorber 110; and
C2 : damping coefficient of the vehicle suspension shock absorbers SA2.

The forces acting between the masses M3, M2, and M1 are given by the following equations:

$$F3 = -K3\, Xi - C3\, \dot{X}i \quad (1)$$

$$F2 = -K2\, X21 - C2\, \dot{X}21 \quad (2)$$

$$F1 = -K1\, X10 \quad (3)$$

In connection with the mass M3 which defines the combined masses of the seat and the occupant, it will be noted that vibrational energy is transmitted thereto through the springs 104 and the shock absorber 110. Given that the acceleration of the mass M3 is denoted by $\ddot{X}s$ it can be shown that:

$$M3\, \ddot{X}s = f = -K3\, Xi - C3\, \dot{X}i \quad (4)$$

If we introduce $\dot{X}s$ on both sides of the equation by multiplying both sides with said value, we obtain:

$$M3\ddot{X}s \cdot \dot{X}s = -K\, Xi \cdot \dot{X}s - C3\, \dot{X}i \cdot \dot{X}s \quad (4)'$$

Subsequently, if we substitute $\dot{X}s = \dot{X}2 + \dot{X}1$ in the right hand side of equation (4)' we obtain:

$$M3\ddot{X}s \cdot \dot{X}s = -K3Xi \cdot \dot{X}2 - K3\dot{X}i - C3\dot{X}i \cdot \dot{X}s \quad (4)$$

Transferring $K3\dot{X}i \cdot Xi$ from the right hand side of the equation to the left one we obtain:

$$M3\ddot{X}s \cdot \dot{X}s + K3Xi \cdot \dot{X}i = -K3Xi \cdot \dot{X}s - C3\dot{X}i \cdot \dot{X}s \quad (5)$$

Expressing the left hand side of equation 5 as a differentiation, we obtain:

$$\frac{d}{dt}\left[\frac{1}{2} M3 \cdot \dot{X}s^2\right] + \frac{d}{dt}\left[\frac{1}{2} K3 \cdot Xi^2\right] = -K3Xi \cdot \dot{X}2 - C3Xi \cdot \dot{X}s \quad (6)$$

The sum of the quantities of the brackets in the left hand side of equation (6) denotes the total energy of mass M3. By denoting the contents of the brackets U and K respectively we obtain:

$$d/dt\, [U+K] = -K3\, Xi\, \dot{X}2 - C3\, \dot{X}i\, \dot{X}s \quad (7)$$

Subsequently, if we substitute $\dot{X}s = \dot{X}si + \dot{X}2$ and rearrange, then we obtain $$d/dt\, [U+K] = -(K3\, Xi + C3\, \dot{X}i)\, \dot{X}2 - C3\, \dot{X}i \quad (8)$$

The right hand side of equation (8) is indicative of the amount of energy which is applied to the seat and the occupant from the suspended mass M2 by way of the springs 104 and the shock absorber 110.

If we further modify the right hand side of equation (8) it can be shown that:

$$d/dt\, [U+K] = -[K3\, Xi2 + C3\, Xi\, \dot{X}i]\dot{X}2/Xi - C3\, \dot{X}i^2 \quad (9)$$

Accordingly, the damping coefficient of the shock absorber 110 is isolated on the right hand side of the equation.

From this equation it will be noted that:

(i) when the .ct of Xi and $\dot{X}i$ is negative, i.e., when Xi and $\dot{X}i$ have unlike signs (polarities), then as C3 per unit time increases, d/dt [U+K]decreases; and (ii) when the product of Xi and $\dot{X}i$ is positive, viz., when Xi and $\dot{X}i$ have like signs (polarities), then as C3 per unit time decreases, d/dt [U+K] increases.

Thus, by observing values which depict the relative displacement and the velocity at which the seat is being displaced, it is possible to control the switching of the shock absorber 110 setting in a manner which varies the value of C3. The desired goal of the kinetic energy to be constantly controlled to a low level small seat velocity will then be achieved.

Figure 12:
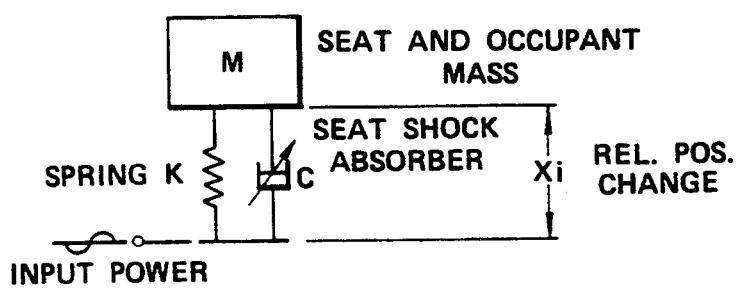
FIG. 12 is a model similar to that shown in FIG. 11 but which shows only the system defined between the vehicle chassis and the seat.

A model of the above described arrangement is shown in FIG. 12.

Figure 13:
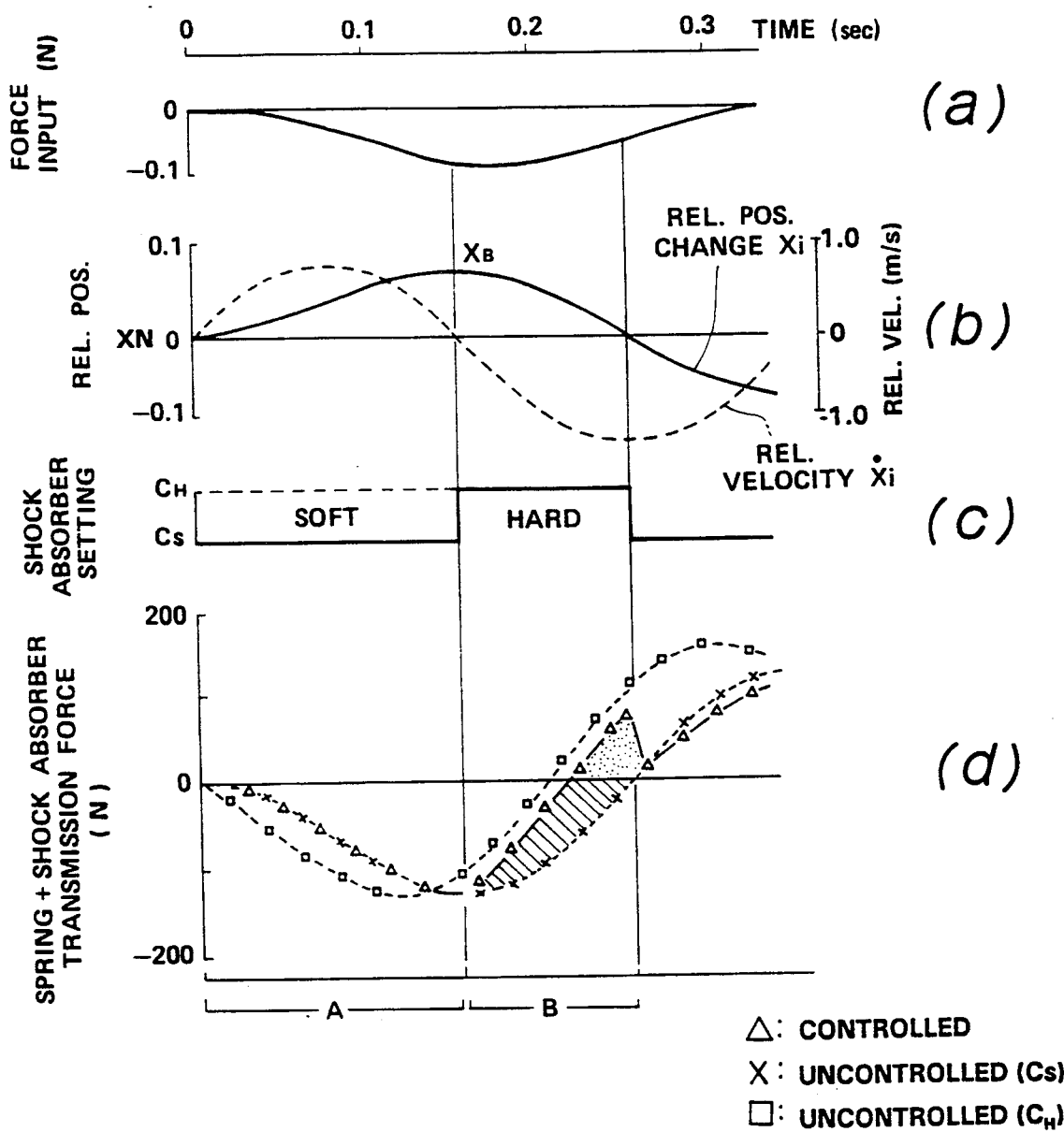
FIG. 13 is timing charts (a-d which show the timing of various events upon which the control and operation of the embodiment of the present invention is based.

FIG. 13 is a timing chart showing the timing with which the shock absorber is switched between its hard and soft damping states. When the input force which tends to be transmitted to the seat through the springs 104 and the shock absorber 110 increases as shown by the trace in chart 13a, a corresponding amount of seat displacement tends to be produced during phase section A, as indicated by trace XB in chart 13b. However, as will be seen, the relative velocity of the seat (trace $\dot{X}i$) tends to increase rapidly and diminish to a zero value just as the displacement and exciting force values peak. During this phase the force which is transmitted through the springs 104 and the shock absorber 110 becomes a larger negative force as demonstrated by the traces shown in chart 13d. It will be noted that in this chart the trace which follows the points marked in triangles denotes the situation wherein the shock absorber 110 is in a condition to produce soft suspension characteristics (Cs=0 Kgfs/m) while the trace interconnecting the rectangles denotes the situation wherein the shock absorber 110 is set to produce hard suspension characteristics (Ch=70 Kgfs/m).

At the interface defined between phases A and B it will be noted that trace XB has a peak positive value while the value of $\dot{X}i$ is essentially zero changing from a positive to a negative value. As the value of Xi and $\dot{X}i$ have opposite signs at this point the shock absorber is conditioned to produce "hard" suspension characteristics. From this point the magnitude of the exciting force decreases and induces a corresponding decrease in the displacement of the seat. At the end of phase B the values of Xi and $\dot{X}i$ both become negative and in response to this the shock absorber is conditioned to produce soft suspension characteristics.

With this arrangement, when the exciting force which is applied from the floor of the vehicle tends to assist the movement of the seat the shock absorber is conditioned to produce soft suspension characteristics and reduces the amount of force which is transmitted to the seat under such circumstances. However, when the exciting force tends to produce a braking effect which tends to stop the movement of the seat, the shock absorber is set to "hard" to take full advantage of the situation.

This control is effective in making it very difficult for the seat to be excited to its resonance frequency.

Figure 14:
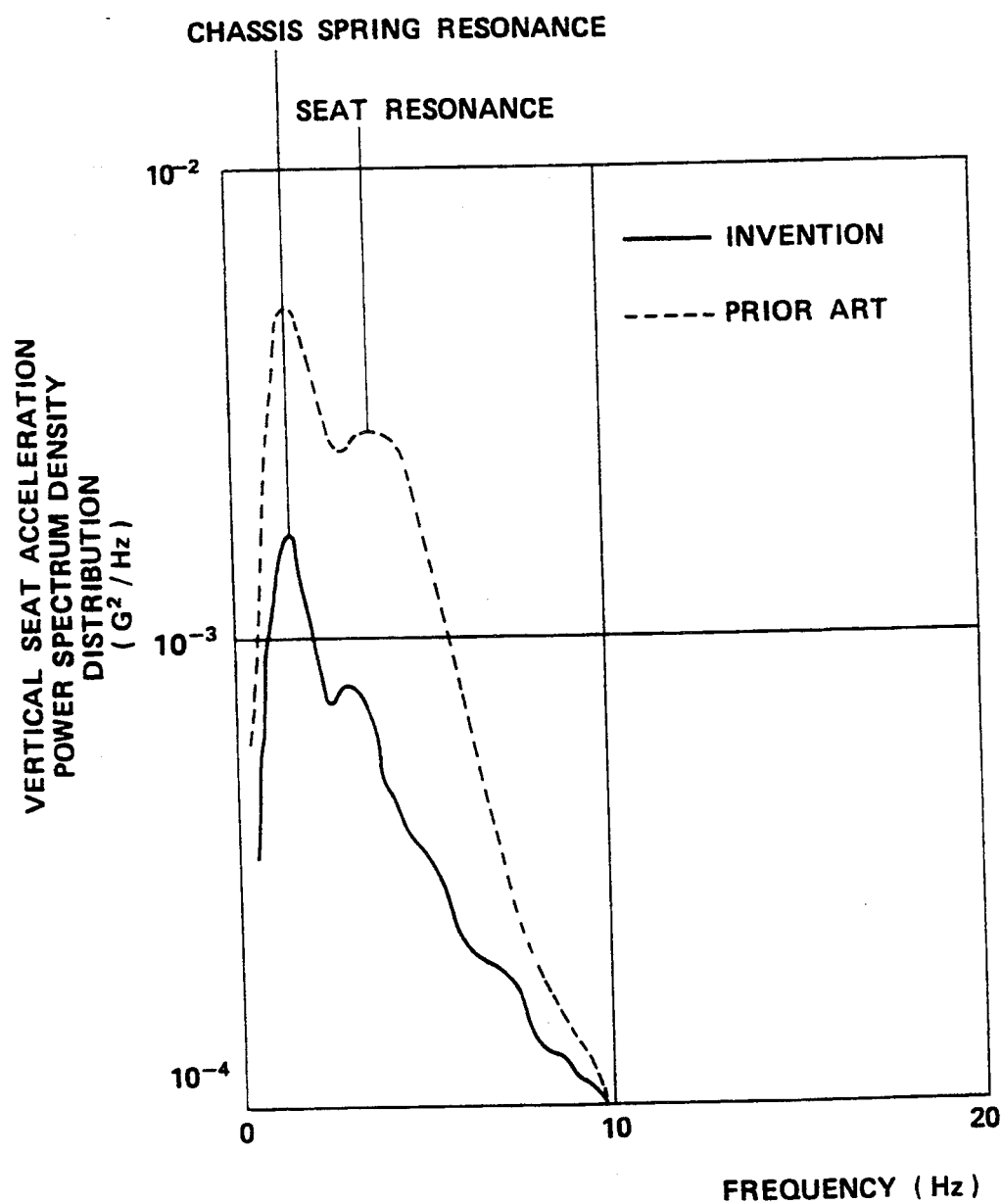
FIG. 14 is a graph showing in terms of frequency and vertical seat acceleration PSD the improvement in suspension characteristics provided by the invention over the electronically controlled prior art arrangement discussed hereinbefore.

The effect of this control is depicted in FIG. 14. In this figure, the broken line denotes the control provided with the prior art arrangement wherein the control of the shock absorber is carried out in synchronism with the suspension control. The solid line denotes the control characteristics provided by the present invention.

As will be noted there are situations in which the frequency at which the resonance frequency of the vehicle suspension occurs and that of the seat suspension occurs are different. Accordingly, when the damping control of both systems is carried out synchronously, a large exciting force cannot be prevented from being applied through the seat suspension shock absorber. By increasing the damping effect of the absorber it is possible to reduce the vibration having a frequency which corresponds to that at which the seat is induced to resonate, but not possible to reduce the vibration which is transmitted to the seat and which has a frequency which corresponds to that of the suspended seat.

Compared to this, as shown by the solid line trace in FIG. 14, the instant embodiment of the present invention is such as to switch the damping effect of the shock absorber in a manner which enables the reduction of the power spectrum in the vicinity of the chassis spring resonance frequency in the order of $\frac{1}{3}$ and the power spectrum in the vicinity of the seat resonance in the order of $\frac{1}{4}$.

It will be noted that it is not absolutely necessary to block both of the seat resonance frequency and the suspended chassis resonance frequency, and it is possible for the control which characterizes the present invention to provide a reduction in both cases.

In addition to resonance of the seat being rendered avoidable with the above arrangement, it is possible to enable the spring to be selected in a manner to have a low spring constant and to thus define an arrangement wherein the seat resonance frequency and the suspended chassis resonance frequency are brought into agreement.

The present invention is not limited to the use of the illustrated shock absorber, and arrangements of the nature disclosed in JP-A-60-248419 which are responsive to an electrical signal in a manner which permits the shock absorbing characteristics to be varied are also possible.

Figure 15:
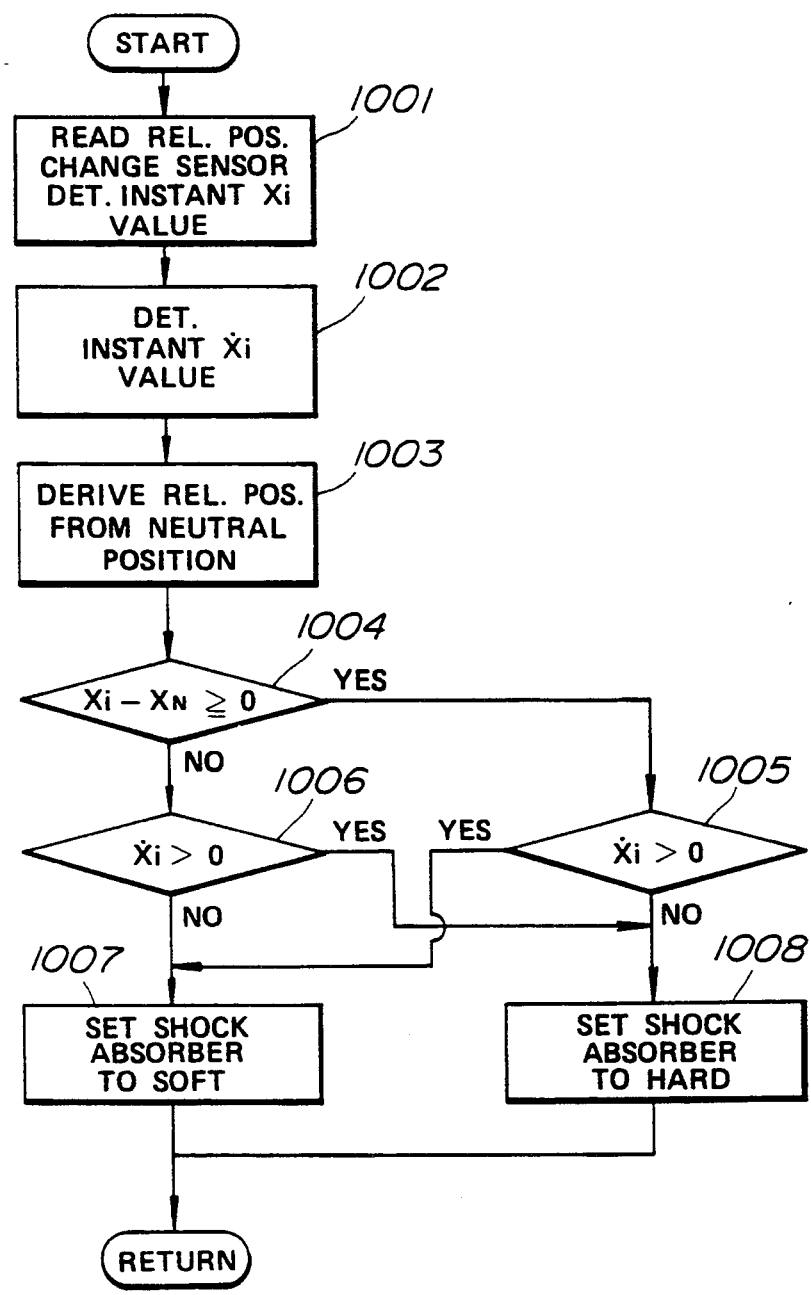
FIG. 15 is a flow chart depicting the control steps which are executed during the operation of the first embodiment of the present invention.

FIG. 15 shows in flow chart form the steps which are executed during the operation of the embodiment of the invention. As will be appreciated, the program depicted by this flow chart is stored in the ROM of the microprocessor 327 illustrated in FIG. 2. As shown, the first step (1001) of this program is such as to read the output of the sensor 323 and thereby determine the instant value of Xi.

At step 1002 the instantaneous rate of change of position (viz., velocity of the seat relative to the chassis) is calculated. This of course can be done by comparing the last recorded value of Xi with the instant value and dividing the result by the time intervals between runs of the program.

At step 1003 a value representative of the relative displacement XN from a selected neutral or equilibrium position, assumed when the shock absorber is neither compressor or extended, is derived.

Subsequently at step 1004 the difference between the instantaneous value of Xi and XN is derived and the difference compared with zero. In the event that the value is greater than or equal to zero the program assigns a positive sign or polarity to Xi and flows to step 1005 wherein the instant value of $\dot{X}i$ is compared with zero. In the event that $\dot{X}i$ in this instance is greater than zero, the program assigns a positive sign or polarity to $\dot{X}1$ and flows across to step 1007 wherein a command to condition the shock absorber to its soft condition is issued. However, in the event that the instant value of $\dot{X}1$ is zero or less, the program assigns a negative sign or polarity to $\dot{X}1$ and flows to step 1008 wherein a command is issued to condition the shock absorber to produce its hard suspension characteristics. As will be understood from the foregoing description of the hardware involved, step 1007 is implemented by rendering transistor 329 conductive, while soft suspension characteristics are achieved by rendering transistor 331 conductive in a manner to permit current to flow through solenoid 226B.

On the other hand, in the event that the outcome of step 1004 is such as to indicate that the difference between the instant value of Xi and XN is less than zero, the program assigns a negative sign or polarity to Xi and flows to step 1006 where the instant value of $\dot{X}i$ is compared with a zero value. In the event that the outcome indicates the instant value of $\dot{X}i$ is greater (positive sign or polarity) than zero, the program flows across to step 1008 while in the case that the outsome indicates that the value of $\dot{X}i$ is zero or less (negative sign or polarity) the program flows to step 1007.

In this manner the vibration of the seat can be controlled in a manner which enables significant improvement in passenger comfort.

The present invention differs from conventional vehicle suspension in the following aspects. In the case of the prior art, as the unsprung mass of the vehicle suspension is large it is difficult to reduce the value of Cs below 100 Kgfs/m. However, with the instant invention as the combined mass of the seat and the occupant is notably less than that of the unsprung mass of the suspension, it is possible to reduce the value of Cs to a range of 50-100 Kgfs/m.

Further, with the above-mentioned prior art vehicle suspensions in order to secure stable characteristics when the vehicle is subject to roll and/or pitching etc., the value of Ch must be limited to about 150 Kgfs/m (piston speed 0.3 m/sec).

On the other hand, with the present invention, as the control is based purely on the vertical movement of the seat, it is possible to select the value of Ch in the range of 100-200 kgfs/m and to use this value with the value of Cs in order to arrive at the ideal suspension characteristics.

In connection with the response of the system, as the impact power input applied to the vehicle chassis tends to increase strongly in the 20Hz region, a response time of less than 0.05 sec is required with the present invention. On the other hand, with the prior art the impact power input applied to the seat tends to be high below 10 Hz. Under these conditions a response time of 0.1 sec is adequate.

Further, with the prior art the seat is controlled indirectly in a predetermined relationship with the vehicle suspension and therefore in accordance with the unsprung mass of the vehicle suspension. On the other hand, the arrangement of the present invention is such that the control is conducted directly in response to the seat vibration.

It will be noted that the instant invention can be applied with advantage to either vehicles having a fixed type of suspension wherein the shock absorbers produce only a single set of suspension characteristics or to vehicles having a suspension system wherein the suspension characteristics are variable.

Examples of variable suspension systems which can modify the hardness of the suspension in accordance with the condition of the road may be found in U.S. Pat. No. 4,648,622 filed on Mar. 10, 1987 in the name of Wada et al. and U.S. Pat. No. 4,657,280 filed on Apr. 14, 1987 in the name of Obanori.

Figure 19:
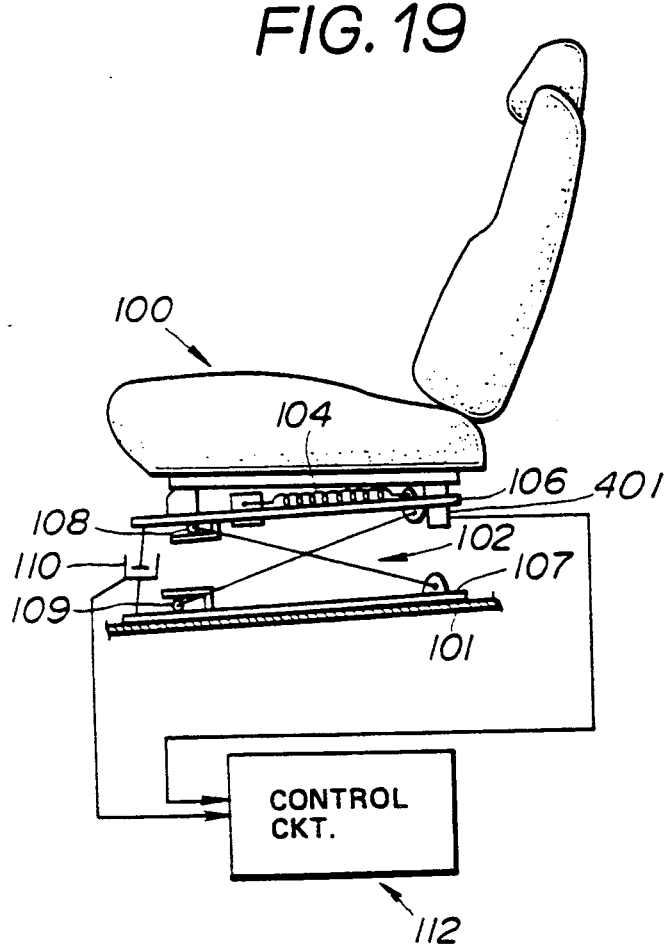
FIG. 19 is a schematic elevation showing the arrangement of a second embodiment of the present invention.

FIG. 19 shows an arrangement which characterizes a second embodiment of the present invention. As will be appreciated, this arrangement differs from the first one in that in this instance the single sensor is replaced with a dual sensor arrangement which enables the acceleration of the seat to be sensed and converted into a velocity signal via integration.

Figure 20:
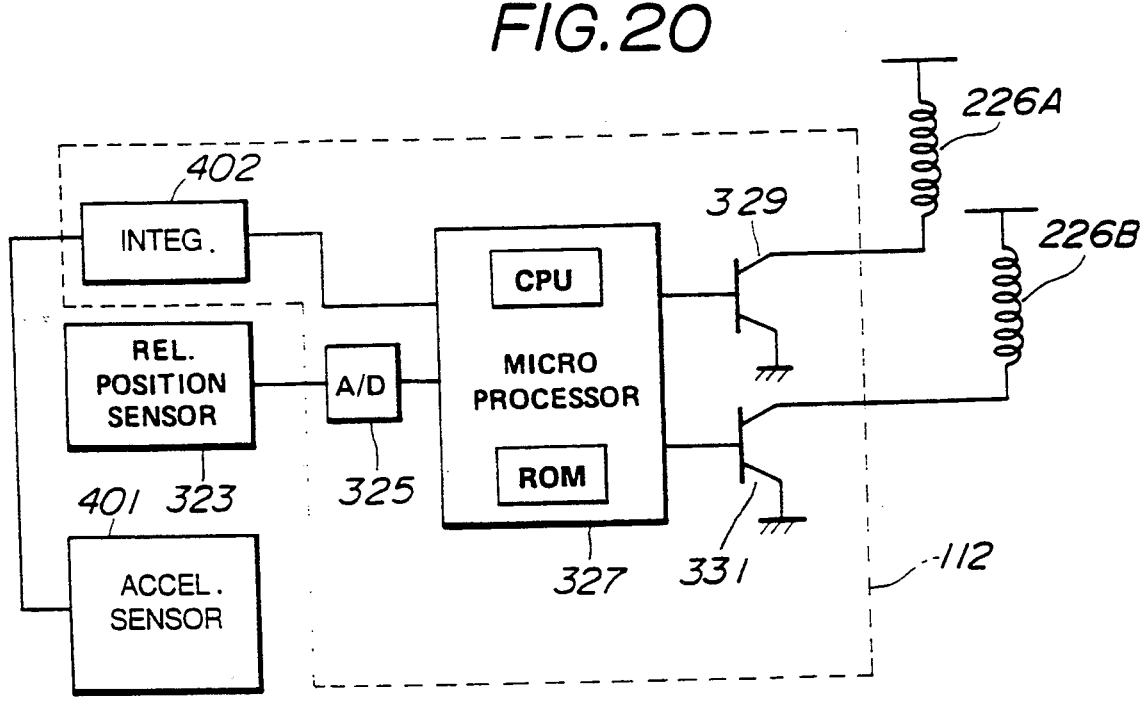
FIG. 20 is a block diagram showing the basic arrangement of the control system employed in the second embodiment of the present invention.

In more detail, the second embodiment features the provision of an accelerometer (acceleration sensor) 401, preferably mounted on the seat. As shown in FIG. 20 the output of the sensor 401 is fed to an integration circuit 402 wherein the acceleration signal is converted to one indicative of velocity. This signal is then applied to the I/O interface (not shown) of the microprocessor 327. The output of the relative displacement sensor (in this instance incorporated in the shock absorbing arrangement) is fed to the I/O via the A/D converter circuit 325.

The second embodiment is based on a similar mathematical process as applicable to the first embodiment and differs only slightly therefrom.

Viz., in the second embodiment equation (5) is replaced with equation (10)

$$M3\ \ddot{X}s\ \dot{X}s + K3\ Xi\ \dot{X}i = -K3Xi\ \dot{X}2 - C3\ \dot{X}i\ (\dot{X}2 + \dot{X}i) \quad (10)$$

As will be appreciated, it can be understood from the relationship shown in FIG. 11 that $\dot{X}s = \dot{X}i + \dot{X}2$. Accordingly, by substituting this value in equation (10) we obtain an equation which is identical to equation (5).

Figure 21:
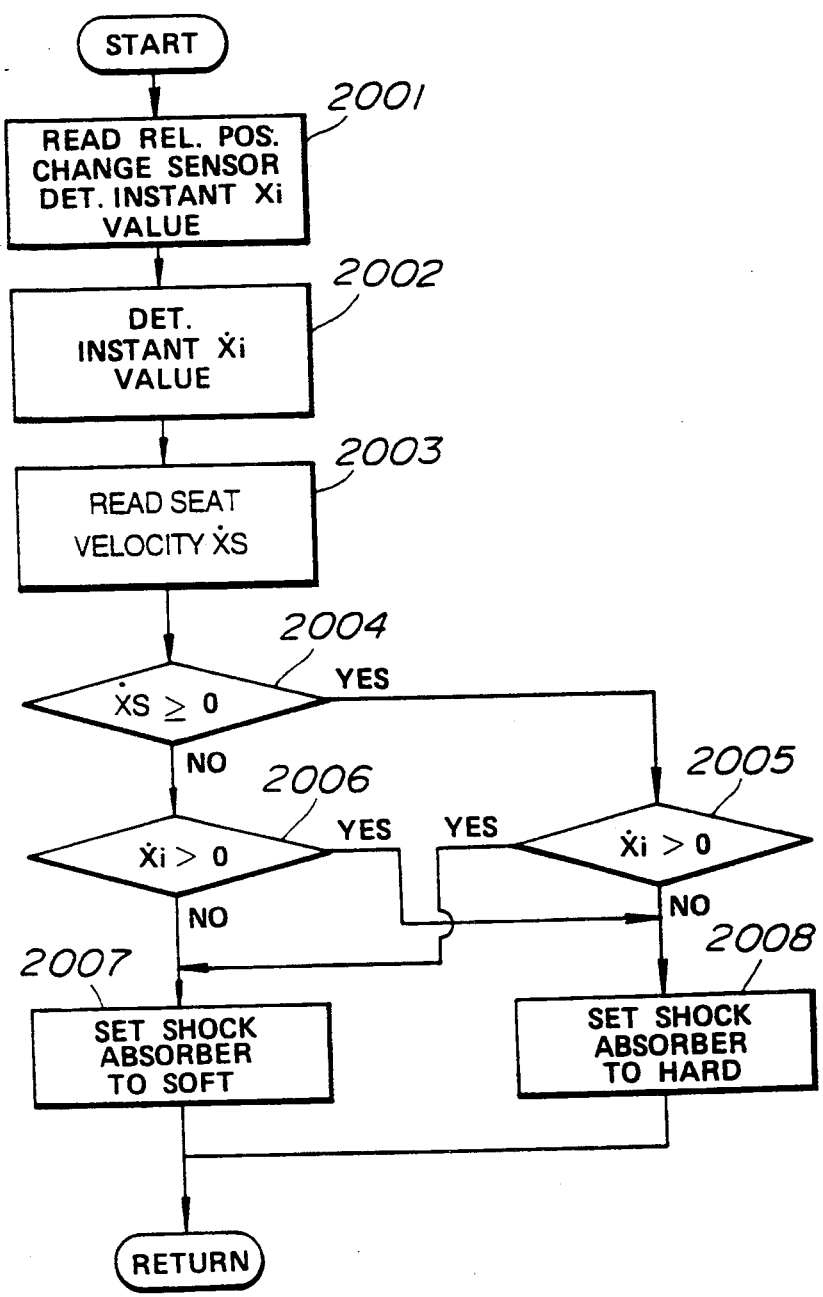
FIG. 21 is a flow chart which shows the characteristic operation of the second embodiment of the invention.

FIG. 21 shows in flow chart form the steps which are executed during the operation of the second embodiment of the invention. As will be appreciated, the program depicted by this flow chart is stored in the ROM of the microprocessor illustrated in FIG. 20. As shown, the first step (2001) of this program is such as to read the output of the sensor 323 and determine the instant value of $Xi$.

At step 2002 the instant rate of change of position (viz., relative velocity of the seat) is calculated. This of course can be done by comparing the last recorded value of $Xi$ with the instant value and dividing the result by the time intervals between runs of the program.

At step 2003 the output of the accelerometer 401 is read and the instant value of $\dot{X}s$ determined. Subsequently, at step 2004 the instant value of $\dot{X}s$ is compared with zero. In the event that the value is greater than or equal to zero, the program flows to step 2005 wherein the instant value of $\dot{X}i$ is compared with zero. In the event that $\dot{X}i$, in this instance, is greater than zero, the program flows across to step 2007 wherein a command to condition the shock absorber to its soft condition is issued. However, in the event that the instant value of $\dot{X}i$ is zero or less, the program flows to step 2008 wherein a command ms issued to condition the shock absorber to produce its hard suspension characteristics.

As previously mentioned, the hardware involved in step 2007 is implemented by rendering transistor 329 conductive, while step 2008 is achieved by rendering transistor 331 conductive in a manner to permit current to flow through solenoid 226B.

On the other hand, in the event that the outcome of step 2004 is such as to indicate that the instant value off $\dot{X}s$ is less than zero, then at step 2006 the instant value of $\dot{X}i$ is compared with a zero value. In the event that the outcome indicates the instant value of $\dot{X}i$ is greater than zero, the program flows across to step 2008 while in the case that the outcome indicates that the value of $\dot{X}i$ is zero or less, the program flows to step 2007.

In terms of operation, it is deemed that the second embodiment, due to the inclusion of two sensors one of which is able to sense the acceleration of the seat per se, provides superior results while in terms of cost the first embodiment is, due to its use of only one sensor, considered superior.

It will be appreciated that the present invention is not limited to the use of a shock absorber and mechanical spring arrangements. The use of air springs, wherein the pressure in an expandable vessel can be controlled in an appropriate manner and in which the height of the seat can be suitably controlled, is equally acceptable. In connection with such a feature, reference can be had to the content of copending U.S. patent application U.S. Ser. No. 912,801, U.S. Pat. No. 4,913,482, filed on Sep. 29, 1986 in the name of Hanai et al. - the content of which is hereby incorporated by reference.

As an alternative to a conventional type of shock absorber arrangement, it is within the scope of the present invention to use electrically controlled damping devices which utilize an electrotheopectic fluid the viscosity of which can be controlled by controlling the application of a voltage between electrode bodies immersed therein. Examples of such vibration damping devices may be found in, for example, JP-A-60-104828 or JP-A-61-74930. Of course, in this instance the control of the damping should be executed in accordance with the above-described inventive manner.

Still other objects and advantages of the present invention will become readily apparent to those skilled in this art from the preceding detailed description, wherein only the preferred embodiments of the invention are illustrated and described, as aforementioned, simply by way of presenting the best modes contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive, the invention being defined solely by the claims appended hereto.

What is claimed is:

1. In a vehicle provided with a chassis and a seat, a seat suspension system for controllably suspending said seat on said chassis, said seat suspension system comprising:
    a spring;
    a vibration damper, said vibration damper being self-contained and without an external source of fluid under pressure, said damper including a device for varying damping characteristics of the same;
    structural members which operatively interconnect said seat and said chassis, said vibration damper being connected at a first end to said seat and at a second end to said chassis;
    a sensor, said sensor being arranged to sense a position of said seat relative to said chassis; and
    a control circuit,
    said control circuit being arranged to be exclusively responsive to an instantaneous output of said sensor and to control said damper;
    wherein said control circuit includes means for determining a position which is indicative of the damper being in a neutral position wherein it is neither compressed or elongated,
    means for comparing the instantaneous output of the sensor with respect to the neutral position to determine the relative position of the seat with respect to said chassis,
    means for assigning a first polarity to the sensor output if the vibration damper is elongated beyond said neutral position and assigning a second polarity to the output if the vibration damper is compressed beyond said neutral position,
    means for determining a relative velocity of the seat from said sensor output,
    means for assigning a first polarity to the relative velocity when the seat is moving in a first direction away from said neutral position and a second polarity to the relative velocity when the seat is moving in a second direction away from said neutral position,
    means for comparing the polarities of the relative position and the relative velocity of said seat, and
    means for conditioning said damper to produce first suspension characteristics when the polarities of the relative position and relative velocity are the same and conditioning said damper to produce second suspension characteristics when the polarities are different.

2. A seat suspension system as claimed in claim 1, further comprising:
    tension control means operatively connected to said spring for varying a tension force in said spring, said spring being operatively connected with the structural members of the suspension in a manner such that as the tension force varies then a bias applied to the structural members varies and thus varies a height at which said seat tends to be supported with respect to said chassis.

3. A method of suspending a vehicle seat on a vehicle chassis, comprising the steps of:
    interconnecting said seat and said chassis with a damper capable of producing first and second damping characteristics;
    sensing a relative position of said seat with respect to said chassis with a sensor exclusively measuring seat displacement;
    determining a relative velocity of said seat with respect to said chassis;
    assigning a positive sign to said relative position when the relative position is above a predetermined neutral value, and a negative sign when the relative position is below the neutral value;
    assigning the positive sign to said relative velocity when said seat is moving in a first direction away from the neutral position and the negative sign when said seat is moving in a second direction away from the neutral position;
    controlling said damper to produce only the first damping characteristic when the signs of said relative position and relative velocity are the same; and
    controlling said damper to produce only the second damping characteristic when the signs of said relative position and relative velocity are different.

4. In a vehicle, an apparatus comprising:
    a chassis;
    a seat;
    a seat suspension for suspending said seat on said chassis, said seat suspension including a spring and a vibration damper, said damper being self-contained and without an external source of fluid under pressure and including an arrangement for discretely varying damping characteristics of the same, said suspension further including structural members which operatively interconnect said seat and said chassis, said damper being connected between said seat and said chassis and said spring being connected to said structural members;
    a first sensor arranged to sense a position of said seat relative to said chassis and to provide a corresponding output;
    a second sensor arranged to sense an acceleration of said seat and to provide a corresponding output; and a control circuit arranged to be exclusively responsive to the outputs of said first and second sensors and to control the damping characteristics of said vibration damper in accordance with a predetermined control schedule;

wherein said control circuit includes:

(1) means for assigning a first polarity to the output of said first sensor if said first sensor indicates that a length of the damper is being elongated beyond a predetermined neutral value and assigning a second polarity to the output of said first sensor if said first sensor indicates that the damper is being compressed beyond said predetermined neutral value;

(2) means for determining a relative velocity of the seat with respect to the chassis from the output of said second sensor;

(3) means for assigning the first polarity to the relative velocity when the seat is moving in a first direction and the second polarity to the relative velocity when the seat is moving in a second direction;

(4) means for comparing the polarities of the relative position and the velocity of said seat; and (5) means for conditioning said damper to produce first predetermined suspension characteristics when the polarities of said relative position and relative velocity are the same and conditioning said damper to produce second predetermined suspension characteristics when the polarities are different.

5. A seat control system as claimed in claim 4, further comprising:

tension control means operatively connected to said spring for varying a tension in said spring in a manner such as to vary a bias force to thereby vary a height at which said seat tends to be supported above said chassis.

6. A method of suspending a vehicle seaton a vehicle chassis, comprising the steps of:

interconnecting said seat and said chassis with a damper capable of producing first and second damping characteristics;

sensing a position of said seat relative to said chassis;

determining a velocity of said seat relative to said chassis;

assigning a positive sign to said relative position when a relative displacement between the seat and the chassis is increasing beyond a predetermined neutral position, and a negative sign when the relative displacement is decreasing beyond said predetermined neutral position;

assigning the positive sign to said velocity when the seat is moving in a first direction and the negative sign when the seat is moving in a second direction;

controlling said damper to produce only said first damping characteristic when the signs of said relative position and relative velocity are the same; and controlling said damper to produce only said second damping characteristic when the signs of said relative position and relative velocity are different.

7. In an automotive vehicle, a seating apparatus with controllably adjustable seating, comprising:

a chassis;

a seat having a mass which is small as compared with a mass of said chassis; and a suspension for suspending said seat on said chassis said suspension comprising a spring operatively arranged with respect to said suspension so as to apply a base force which controls a height of the seat above said chassis, a damper including damper control means for discretely varying a damping effect provided by the damper between predetermined high and low levels, said damper being operatively connected between said seat and said chassis, a displacement sensor operatively disposed for detecting a relative displacement between said seat and said chassis, and control means, operatively connected between said displacement sensor and said damper control means and exclusively responsive to said displacement sensor, for varying the damping effect of the damper, said control means including means for establishing a neutral seat position as a control parameter, means for deriving the relative displacement between said seat and said chassis, means for assigning a positive polarity to the relative displacement when the seat is moving upwardly from said neutral position and a negative polarity when the seat is moving downwardly from said neutral position, means for deriving a relative velocity between said seat and said chassis from an output of said displacement sensor and means for assigning the positive polarity to the relative velocity when the seat is moving upwardly and the negative polarity when the seat is moving downwardly, and means for outputting a control signal to the damper control means to produce said low damping level when the polarities of said relative displacement and relative velocity are the same and to produce the high damping level when the polarities of said relative displacement and said relative velocity are different.

8. In an automotive vehicle, a seating apparatus with controllably adjustable seating, comprising:

a chassis;

a seat having a means which is small as compared with the mass of said chassis; and a suspension for suspending said seat on said chassis, said suspension comprising a spring operatively arranged with respect to said suspension so as to apply a bias force which controls a height of the seat above said chassis, a damper including damper control means for discretely varying a damping effect provided by the damper between predetermined high and low levels, said damper being operatively connected between said seat and said chassis, a displacement sensor operatively disposed for detecting a relative displacement between said seat and said chassis, and control means, operatively connected between said displacement sensor and said damper control means and exclusively responsive to said displacement sensor, for varying the damping effect of the damper, said control means including means for establishing a neutral seat position as a control parameter, means for deriving a relative velocity from an output of said displacement sensor, means subtracting said neutral position from the relative displacement indicated by said displacement sensor, means, when the outcome of the subtraction is positive, for comparing the relative velocity with a predetermined value and setting the damper to said low level if the relative velocity is greater than said predetermined value and setting said damper to said high level if the relative velocity is lower than said predetermined value, and means, when the outcome of the subtraction is negative, for comparing the relative velocity with said predetermined value and setting the damper to said high level if the relative velocity is greater than said predetermined value and setting said damper to said low level if the relative velocity is lower than said predetermined value.

9. In combination, an automotive vehicle comprising:
a chassis;
a seat, said seat having a mass which is small as compared with the mass of said chassis; and
a suspension for suspending said seat on said chassis, said suspension comprising:
a spring, said spring being operatively arranged with said suspension so as to apply a bias which controls the height of the seat above said chassis;
a damper, said damper including control means for discretely varying the damping effect provided by the damper between high and low levels, said damper being operatively connected between said seat and said chassis;
a displacement sensor operatively connected to said seat;
an accelerometer disposed on said seat;
control means operatively connected between said displacement sensor, said accelerometer and said damper control means, said control means including circuitry means for:
deriving a relative velocity between said seat and said chassis from the output of said displacement sensor, assigning a positive polarity to the relative velocity when the seat is moving upward, and assigning a negative polarity when the seat is moving downward;
deriving the absolute velocity of said seat from an output of said accelerometer, assigning a positive polarity to the absolute velocity when the seat is moving upward, and assigning a negative polarity when the seat is moving downward;
outputting a control signal to the damper control means which sets said damper to produce the low damping level when the polarities of the relative velocity and the absolute velocity are the same and outputting a control signal to said damper control means which sets said damper to produce said high damping level when the polarities of the relative velocity and the absolute velocity are different.

10. In combination, an automotive vehicle comprising:
a chassis;
a seat, said seat having a mass which is small as compared with the mass of said chassis; and
a suspension for suspending said seat on said chassis, said suspension comprising:
a spring, said spring being operatively arranged with said suspension so as to apply a bias which controls the height of the seat above said chassis;
a damper, said damper including control means for discretely varying the damping effect provided by the damper between first and second levels, said damper being operatively connected between said and said chassis;
a displacement sensor operatively connected to said seat;
an accelerometer disposed on said seat;
control means operatively connected between said displacement sensor, said accelerometer and said damper control means, said control means including circuitry means for:
deriving the relative velocity between said seat and said chassis from an output of said displacement sensor;
deriving the absolute velocity of said seat from an output of said accelerometer;
comparing, in the event that the absolute velocity is greater than or equal to a first predetermined value, the relative velocity with a second predetermined value, setting the damper to said second level in the event that the relative velocity is less than said second predetermined value, and setting the damper to said first level in the event that the relative velocity is greater than said second predetermined value; and
comparing, in the event that the absolute velocity is less than said first predetermined value, the relative velocity with said second predetermined value and setting said damper to said first level in the event that the relative velocity is lower than said second predetermined value and setting said damper to said second level in the event that the relative velocity is higher than said second predetermined value.

11. A method of suspending a vehicle seat on a vehicle chassis, comprising the steps of:
interconnecting said seat and said chassis with a damper capable of producing first and second damping characteristics;
sensing a relative position of said seat with respect to said chassis;
determining a relative velocity of said seat with respect to said chassis;
assigning a positive sign to said relative position when the relative position is above a predetermined neutral value, and a negative sign when the relative position is below the neutral value;
assigning a positive sign to said relative velocity when said seat is moving in a first direction away from the neutral position and a negative sign when said seat is moving in a second direction away from the neutral position;
controlling said damper to produce the first damping characteristic when the signs of said relative position and relative velocity are the same; and
controlling said damper to produce the second damping characteristic when the signs of said relative position and relative velocity are different,
wherein said damper is controlled to produce the first or second damping characteristic only in response to sensing of said relative position and said relative velocity of said seat with respect to said chassis.

* * * * *